Figure 1:
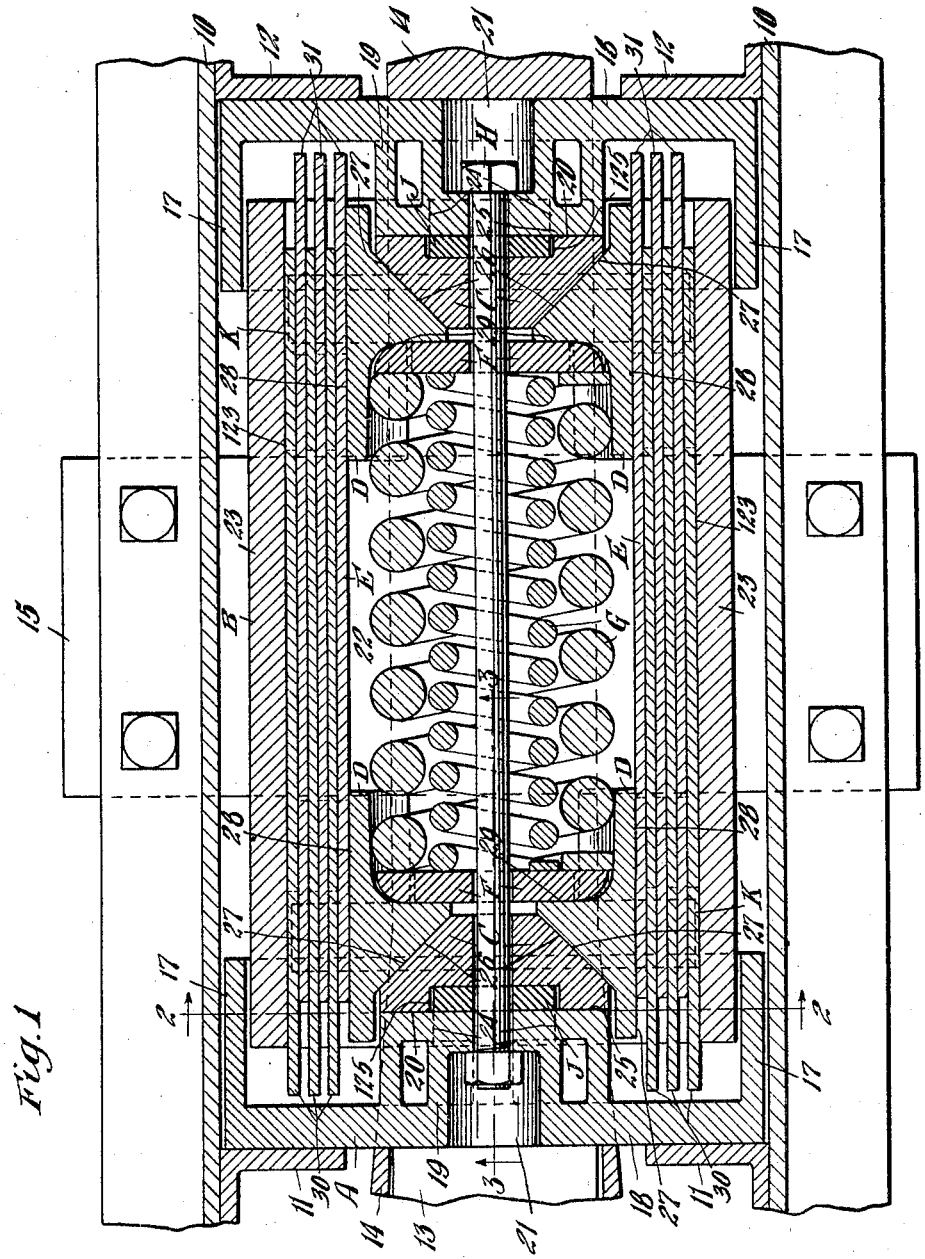

Feb. 28, 1928. 1,660,568
J. F. O'CONNOR
FRICTION SHOCK ABSORBING MECHANISM
Original Filed July 2, 1923  2 Sheets-Sheet 1

Witnesses
Wm. Geiger

Inventor
John F. O'Connor
By George I. Haight
His Atty.

Feb. 28, 1928.  
J. F. O'CONNOR  
FRICTION SHOCK ABSORBING MECHANISM  
Original Filed July 2, 1923    2 Sheets-Sheet 2
1,660,568
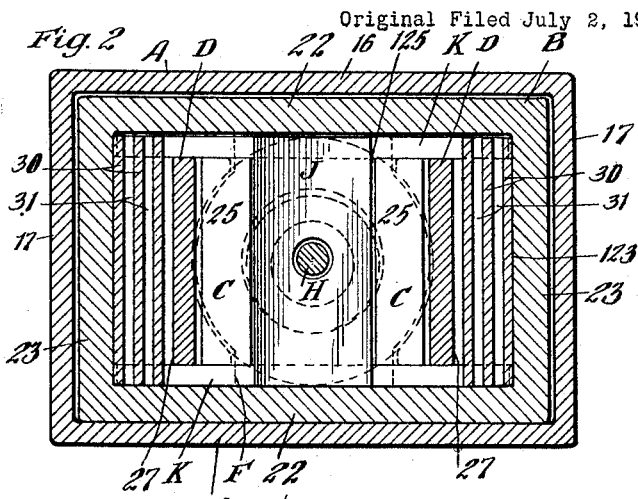
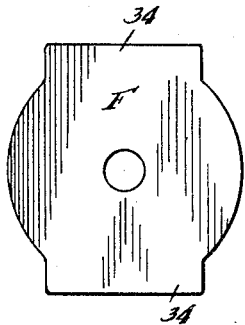
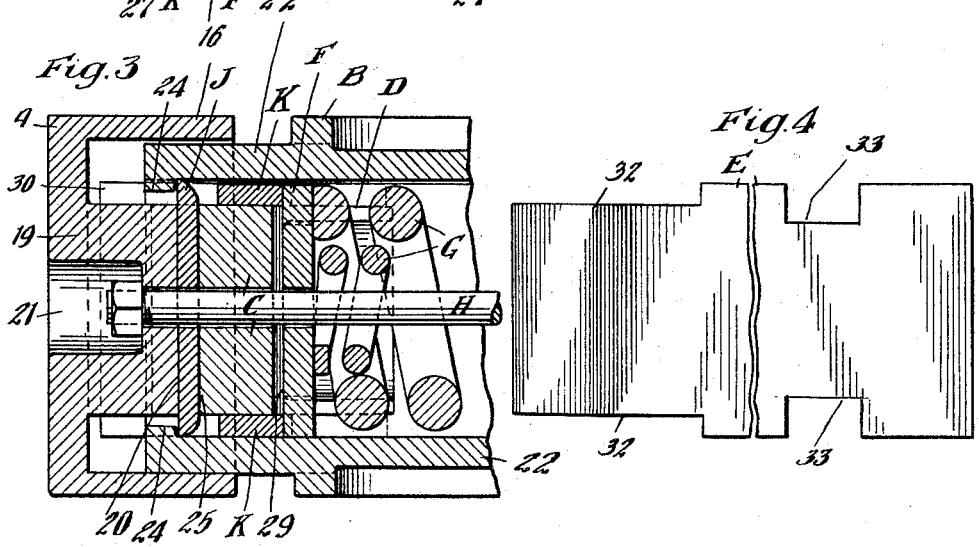
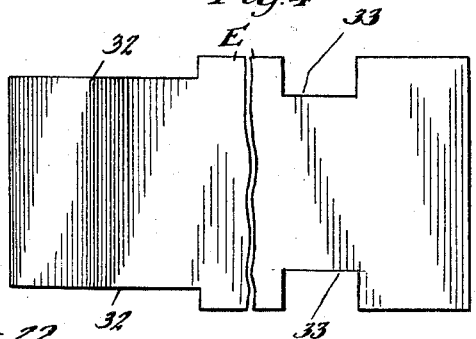
Witnesses  
Wm. Geiger
Inventor  
John F. O'Connor  
By George J. Haight  
His Atty.

Patented Feb. 28, 1928.

1,660,568

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed July 2, 1923, Serial No. 648,902. Renewed June 30, 1927.

This invention relates to improvements in friction shock absorbing mechanisms.

One object of the invention is to provide a friction shock absorbing mechanism, more particularly adapted for railway draft riggings, where in is obtained high capacity due to large frictional areas together with a preliminary action during compression and easy release.

Another object of the invention is to provide a friction shock absorbing mechanism of the intercalated plate type, including a friction shell, wherein the elements are completely enclosed by the shell, thereby protecting the same from drippings from the car and preventing malicious tampering with the mechanism.

A still further object of the invention is to provide a friction shock absorbing mechanism of the type referred to wherein the shell is in one piece, thereby providing a design of great final column strength, together with means for adjusting the gear to correct length, to overcome any inaccuracies due to manufacturing conditions and also compensate for wear.

Other objects and advantages of the invention will more clearly appear from the description and claims hereinafter following.

In the drawings, forming a part of this specification, Figure 1 is a horizontal, longitudinal, sectional view of a railway draft rigging showing my improvements in connection therewith. Fig. 2 is a vertical, transverse, sectional view, corresponding substantially to the line 2—2 of Fig. 1. Fig. 3 is a vertical, longitudinal, sectional view corresponding substantially to the line 3—3 of Fig. 1. Fig. 4 is a detailed, side elevational view, partly broken away, of one of the friction plates used in connection with my improved shock absorbing mechanism. And Fig. 5 is a detailed, elevational view of one of the spring followers.

In said drawings, 10—10 indicate channel shaped center or draft sills, to the inner faces of which are secured front stop lugs 11 and rear stop lugs 12. A portion of the draw-bar is shown at 13, to which is attached a hooded yoke 14. The shock absorbing mechanism proper, including the front and rear followers, is disposed within the yoke 14, and the movable parts of the draft rigging are supported by the detachable saddle plate 15.

The improved shock absorbing mechanism, comprises, broadly, front and rear followers A—A; a central friction shell or casing B; front and rear wedge blocks C—C; front and rear pairs of wedge shoes D—D; two groups of friction plates E—E; front and rear spring followers F—F; a spring resistance G; a retainer bolt H; front and rear key plates J—J; and two pairs of front and rear keys K—K.

The front and rear followers A are of like construction, each being provided with top and bottom walls 16—16, side walls 17—17, and a transversely disposed end wall 18. The top, bottom and side walls of the followers are relatively short, as clearly shown in Fig. 1, and the end walls are adapted to co-act with the front and rear stop lugs in the usual manner. The end walls 18 are each provided with an inwardly extending, hollow projection 19 spaced from the top, bottom and side walls of the follower, being of a height to extend loosely into the shell B and and having a flat end face 20 adapted to form an abutment for the corresponding wedge block C. Each of the end walls 18 is also provided with a central opening 21, through which the retainer bolt or nut may be inserted.

The friction shell or casing B is in the form of a rectangular casing, open at its opposite ends, and has spaced, longitudinally disposed, top and bottom walls 22—22 and longitudinally extending, spaced, side walls 23—23, the inner sides of the walls 23 forming longitudinally extending friction surfaces 123 adapted to co-act with the outermost plates of the groups of friction plates E. At opposite ends the upper and lower walls of the casing are provided with transversely disposed, alined, upper and lower, central projecting flanges 24, and adapted to accommodate the projection 19 of the corresponding follower A therebetween. As clearly shown in Figure 1, the shell B is of such a length that the front and rear ends thereof extend beyond the inner ends of the walls of the front and rear followers and are overlapped thereby.

The front and rear wedge blocks C are of like construction, each block being of a height equal to the projection 19 and having a flat outer face 25 adapted to abut the face 20 of one of the followers A, and a pair of faces 26 at the opposite end thereof, converging inwardly and adapted to co-act with the adjacent pairs of friction wedge shoes D. The outer face 25 of each of the blocks C is cut away at the center to provide a vertically extending opening or recess 125 adapted to accommodate the corresponding key plate J.

The key plates J are of like construction, being of generally rectangular outline and are arranged at the front and rear ends of the mechanism, each being seated in the recess 125 of one of the wedges C and having its outer surface abutting the adjacent projection 19 of the corresponding follower A. The upper and lower ends of the plates J extend above and below the projections 19 and are adapted to respectively engage the upper and lower flanges 24 of the casing B to effect return of the latter to normal position.

The friction wedge shoes D are four in number, arranged in pairs at opposite ends of the mechanism, each pair co-acting with the corresponding wedge block C. Each of the friction wedge shoes D is of a height equal to the wedge C and is provided with a wedge face 27 adapted to co-act with one of the wedge faces 26 of one of said wedge blocks, an outer elongated friction face 28 adapted to co-act with the innermost friction plate of one of the groups B, and a rear face 29 forming an abutment for the spring follower F. As clearly shown in Fig. 1, each of the shoes D is in the form of an elongated member, cut away at its inner side to provide a concave surface rearwardly of the face 29 adapted to receive the side of the outer coil of the spring resistance G.

The keys K are four in number, arranged in pairs at opposite ends of the mechanism, each pair comprising an upper and lower key interposed between the corresponding spring follower F and the key plate J and sliding between the upper and lower walls of the casing and the corresponding wedge C. The keys K extend from side to side of the casing and have their opposite ends slightly spaced from the side walls, as clearly shown in Fig. 1, to permit free movement of the same.

The friction plates E are longitudinally arranged within the shell B and comprise two oppositely disposed groups. As herein shown, the groups of plates E each comprises three plates 30 and three plates 31, the plates 30 and 31 being alternated, with a plate 30 of each group arranged outermost and in contact with the inner surface 123 of one of the walls 23 of the shell B, and a plate 31 of each group arranged innermost and in contact with the faces 28 of the adjacent front and rear wedge shoes D. The plates 30 and 31 are of similar construction and, as best shown in Fig. 4, each plate has the upper and lower edges cut away at one end thereof, to provide a reduced portion 32, the reduced portions of the plates 30 and 31 being adapted to work between the walls 22 and the keys K at the rear and front ends, respectively, of the shell B, the reduced portions being of such length as to permit full movement of the plates during compression of the mechanism. Near the opposite end, each plate has the upper and lower edges recessed as indicated at 33 to loosely receive the ends of the upper and lower keys K. The plates 30 and 31 are thus connected to the front and rear keys respectively for movement therewith. The plates 30 and 31 are reversely arranged and have those ends thereof, which are anchored respectively to the front and rear keys K, extending beyond the outer ends of the shell and normally slightly spaced from the front and rear followers.

The front and rear spring followers F are of similar construction, each being in the form of a flat plate of generally circular outline provided with upper and lower extensions 34 projecting above and below the shoes D and adapted to co-act with the corresponding upper and lower keys K.

The spring resistance G extends longitudinally of the mechanism and is interposed between the front and rear spring followers F, which directly abut the faces 29 of the front and rear shoes D.

The mechanism is held under initial compression by the retainer bolt H, anchored to the projections 19 of the front and rear followers A and extends through the inner coil of the spring resistance and alined openings in the front and rear spring followers F and the front and rear wedge blocks C. The retainer bolt also serves as means for adjusting the gear to correct overall length, whereby inaccuracies due to manufacturing conditions may be overcome.

The operation of my improved shock absorbing mechanism is as follows, assuming an inward or buffing movement of the drawbar. Upon inward or rearward movement of the drawbar, the front follower A will be moved therewith forcing the front wedge C and the shoes D rearwardly therewith, compressing the spring resistance G and thereby forcing the rear pairs of shoes D into tighter engagement with the rear wedge C. At the same time, the wedging action will be set up between the front and rear wedges and the shoes D, placing the friction plates under lateral pressure. As the rearward movement of the front follower A continues, the front shoes D will tend to move the friction plates and the shell B therewith due to the friction between the front shoes D and the innermost plates of each group. At the same time, there will be an equal resistance to the rearward movement of the plates and the shell B due to the friction between the rear shoes D and the innermost plates of each group. Due to this balancing action, the rear end of the shell B and the rear ends of the plates will approach the rear follower A at substantially the same rate as the front follower approaches the front end of the shell B and the front ends of the plates, while the front shoes slip on the inner plates 31 and the latter slip on the rear shoes D. As will be evident, during the relative movement of the shoes and the shell B together with the friction plates, the spring followers F will be moved away from the keys K and the key plates J will be moved out of engagement with the front and rear flanges 24 of the shell B. This action will continue until the front follower engages the front ends of the plates 30 and the rear ends of the plates 31 engage the rear follower A, whereupon the plates 30 will be moved rearwardly directly by the front follower while the plates 31 will be held stationary by contact with the rear follower, thereby effecting relative movement of the plates 30 and 31 opposed by the frictional resistance between the co-acting surfaces of the plates.

It will be evident that the rear end of the shell B will abut the rear follower before the front follower engages the front end of the shell, holding the same stationary and causing the outermost plates 30 to slide on the friction surfaces 123 of the shell B until the front end of the latter is engaged by the front follower. The described movement of the followers, plates and shell continues until the actuating force is removed or until the front and rear ends of the shell B abut the front and rear followers A, as hereinbefore described, whereupon the force is transmitted directly through the shell to the rear stop lugs.

In assembling the device, the two coils of the spring resistance G are first inserted within the shell, the outer coil being rotated while being inserted to thread the same between the ribs 24. The front and rear spring followers are then placed within the shell by entering the same from the opposite ends and tilting so as to clear the ribs 24. The keys K are next placed in position on the plates within the notches 33, the notches 33 being of sufficient depth so that the keys will clear the ribs 24 when the plates are entered into the casing. The two groups of friction plates with the keys thus roughly assembled therewith, are next placed within the casing. The friction wedge shoes and the main wedge elements are then placed in position and the assemblage is compressed so that the front and rear key plates J may be placed in position, the same being slightly inclined while inserted within the shell to clear the ribs 24. When the parts have been thus assembled, the front and rear follower acting members are connected by the retainer bolt H.

During draft the action is the reverse of that just described, the rear follower being moved forwardly while the front follower is held stationary.

Upon removal of the actuating force, the wedge pressure will be relieved and there will be an initial release movement of the front friction shoes and the wedge C due to the front spring follower F being spaced from the keys K during compression of the mechanism. The only resistance which must be overcome is, therefore, the friction between the front shoes and the innermost plates of each group. This initial release movement allows the spring resistance to expand, relieving the wedge pressure between the rear wedge C and the shoes D and assures an easy release and quick and certain reduction of the lateral pressure on the groups of plates at both ends. As the front spring follower F and the shoes D move outwardly relatively to the shell B and the friction plates, due to the expansion of the spring resistance, the spring followers F will engage the front keys K and move the same and the friction plates 30 connected thereto outwardly also. The friction plates 31 will be carried forward with the plates 30, due to the friction existing therebetween, until the rear keys K moving with the plates 31 engage the rear spring follower F, whereupon the plates 31 will be held stationary. At the same time the key plate J which is carried forwardly with the front wedge C will approach the flanges 24 at the front end of the shell B and engage the same, whereupon the shell will be moved forwardly also, until all the parts are restored to normal position with the rear flanges 24 of the shell again abutting the rear key plate J.

As wear occurs on the various friction and wedge surfaces, compensation therefor is had by the shoes D being pushed outwardly by the expansion of the spring resistance G, which, as hereinbefore described, is under initial compression.

From the preceding description taken in connection with the drawings, it will be evident that the parts of the mechanism are completely enclosed by the followers and shell, in that the upper and lower walls of both front and rear followers at all times overlap the front and rear ends of the one piece shell, thereby protecting the mechanism from drippings of the car and also preventing malicious tampering with the same.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a plurality of groups of intercalated, relatively longitudinally movable, friction plates, each group comprising a plurality of sets of plates; of a shell enclosing said plates; front and rear followers co-acting with said plates; a spring resistance disposed between said groups of plates; means between the opposite ends of said spring resistance and followers for creating pressure on said groups of intercalated plates during the compression action of the mechanism; spring followers co-acting with said spring resistance; and means engaged by the spring followers for restoring said sets of plates to normal position, with the ends at one end of each set spaced from the adjacent follower.

2. In a friction shock absorbing mechanism, the combination with a plurality of groups of intercalated, relatively longitudinally movable, friction plates, each group comprising a plurality of sets of plates; of a casing enclosing said plates; front and rear followers co-acting with said plates; a spring resistance disposed between said groups of plates; means between the opposite ends of said spring resistance and followers for creating pressure on said groups of intercalated plates during the compressive action of the mechanism; spring followers; and means co-acting with said spring resistance and operating independently of said pressure creating means for restoring said plates to normal position.

3. In a friction shock absorbing mechanism, the combination with front and rear followers; of a friction casing, said casing and followers being relatively movable; a plurality of groups of longitudinally extending, relatively movable, intercalated, friction plates within said casing and disposed between said followers; a longitudinally extending spring resistance disposed between said sets of plates; wedge acting means at opposite ends of said spring resistance for creating pressure on said groups of plates; and means interposed between said followers and wedge acting means for restoring said casing to normal position.

4. In a friction shock absorbing mechanism, the combination with front and rear followers; of a casing having interior friction surfaces, said casing having its opposite ends normally spaced from said followers, and said followers and casing being relatively movable; a plurality of groups of intercalated friction plates, the intercalated plates of each group being movable relatively to each other and adapted to be so moved during the compressive action of the mechanism; a spring resistance arranged between said groups of plates; wedge pressure creating means at opposite ends of said spring resistance and co-acting with said plates; means for restoring said casing to normal position; and means independent of said last named means for restoring said plates to normal position.

5. In a friction shock absorbing mechanism, the combination with front and rear main followers; of a casing interposed between said followers, said casing having interior friction surfaces; a plurality of groups of friction plates within said casing, the plates composing each group being movable relatively to each other and adapted to be so moved during compressive action of the mechanism; a spring resistance disposed between said groups of plates; front and rear wedges adapted to be actuated by said followers; front and rear pairs of wedge shoes co-acting with said wedges and friction plates; a spring follower co-acting with each pair of wedge shoes; a floating key engaged by each of said spring followers, said key being anchored to alternate friction plates of each group to effect restoration of the same to normal position; a key plate interposed between each main follower and wedge; and abutment means on said casing adjacent the opposite ends thereof adapted to be engaged by said key plates for restoring said casing to normal position.

6. In a friction shock absorbing mechanism, the combination with front and rear follower casings; of a friction shell having its opposite ends telescoped within said follower casings; a plurality of groups of intercalated friction plates within said shell, the intercalated plates of each group being movable relatively to each other and adapted to be so moved during the compressive action of the mechanism; and wedge pressure creating means co-acting with said friction plates.

7. In a friction shock absorbing mechanism, the combination with a casing; of two laterally separated groups of friction plates disposed within said casing, each group comprising two relatively movable sets of plates; lateral wedge pressure creating means interposed between said groups of plates and co-operable therewith, said means including wedge elements and friction shoes; means movable with said elements and having engagement with said casing to limit the relative outward movement of said casing and wedge elements; a spring resistance; and means anchored to said plates and movable independently of said last named means and wedge elements, co-acting with said spring resistance for restoring said plates to normal position.

In witness that I claim the foregoing I have hereunto subscribed my name this 22nd day of June, 1923.

JOHN F. O'CONNOR.